(12) United States Patent
Suh et al.

(10) Patent No.: US 7,298,744 B1
(45) Date of Patent: Nov. 20, 2007

(54) METHOD AND APPARATUS FOR CENTRALIZED PROCESSING OF CONTIGUOUSLY AND VIRTUALLY CONCATENATED PAYLOADS

(75) Inventors: Soowan Suh, San Ramon, CA (US); Jing Ling, Fremont, CA (US); Juan-Carlos Calderon, Fremont, CA (US); Jean-Michel Caia, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 803 days.

(21) Appl. No.: 10/749,542

(22) Filed: Dec. 30, 2003

(51) Int. Cl.
*H04L 12/28* (2006.01)
*H04L 12/56* (2006.01)

(52) U.S. Cl. .......... 370/393; 370/395.51; 370/466; 370/539; 370/907; 709/201; 709/202; 709/203; 709/213; 709/214

(58) Field of Classification Search ............ None
See application file for complete search history.

(56) References Cited

U.S. PATENT DOCUMENTS

| 6,842,455 | B1 * | 1/2005 | Heuer .................. 370/393 |
| 2003/0007519 | A1 * | 1/2003 | Murton et al. .......... 370/539 |
| 2003/0043851 | A1 * | 3/2003 | Wu et al. ............... 370/476 |
| 2003/0074449 | A1 * | 4/2003 | Smith et al. ............ 709/226 |

\* cited by examiner

*Primary Examiner*—Raj K. Jain
(74) *Attorney, Agent, or Firm*—Blakley, Sokoloff, Taylor & Zafman LLP

(57) ABSTRACT

A method and apparatus for processing at least two types of payloads received at varying intervals in a communications network using a single processing path is provided. The two types of payloads may include virtually and contiguously concatenated payloads according to SONET/SHD architecture. The method comprises assigning pseudo indices to payloads having no indices associated therewith and providing both sets of payloads, including indices and pseudo indices, to the single processing path.

17 Claims, 14 Drawing Sheets if (current slot index is not divisible by 3) then if (current word number = 0) then MFI (current slot index) = MFI (current slot index - 1)

else if (current slot is a master slot) then if (current word number = 1) then temporary MFI (current slot index) = temporary MFI (current slot index) + 1 elseif (current word number = 0) then

MFI (current slot index) = temporary MFI (current slot index)

else if (current word number = (current slot index / 3) + 1) then temporary MFI (current slot index) = temporary MFI (current slot index - 3)

elseif (current word number = 0) then

MFI (current slot index) = temporary MFI (current slot index)

| | | | | | | | |
|---|---|---|---|---|---|---|---|
| | | | | | | | 24 |
| | | | | | | 24 | 48 |
| | | | | | 24 | 48 | 72 |
| | | | | 24 | 48 | 72 | 96 |
| | | | 24 | 48 | 72 | 96 | 120 |
| | | 24 | 48 | 72 | 96 | 120 | 144 |
| | 24 | 48 | 72 | 96 | 120 | 144 | 168 |
| 1 | 24 | 48 | 72 | 96 | 120 | 144 | 168 |

FIG. 13E

| | | | | | | | |
|---|---|---|---|---|---|---|---|
| | | | | | | | 48 |
| | | | | | | 48 | 72 |
| | | | | | 48 | 72 | 96 |
| | | | | 48 | 72 | 96 | 120 |
| | | | 48 | 72 | 96 | 120 | 144 |
| | | 48 | 72 | 96 | 120 | 144 | 168 |
| | 25 | 48 | 72 | 96 | 120 | 144 | 168 |
| 1 | | 48 | 72 | 96 | 120 | 144 | 168 |

METHOD AND APPARATUS FOR CENTRALIZED PROCESSING OF CONTIGUOUSLY AND VIRTUALLY CONCATENATED PAYLOADS

BACKGROUND OF THE INVENTION

1. Field of the Invention

The present invention relates generally to the field of high speed data transfer, and more specifically to managing contiguously and virtually concatenated payloads in specific data transfer architectures, such as SONET/SDH.

2. Description of the Related Art

Data communication networks receive and transmit ever increasing amounts of data. Data is transmitted from an originator or requester through a network to a destination, such as a router, switching platform, other network, or application. Along this path may be multiple transfer points, such as hardware routers, that receive data typically in the form of packets or data frames. At each transfer point data must be routed to the next point in the network in a rapid and efficient manner.

Data transmission over fiber optics networks may conform to the SONET and/or SDH standards. SONET and SDH are a set of related standards for synchronous data transmission over fiber optic networks. SONET is short for Synchronous Optical NETwork and SDH is an acronym for Synchronous Digital Hierarchy. SONET is the United States version of the standard published by the American National Standards Institute (ANSI). SDH is the international version of the standard published by the International Telecommunications Union (ITU). As used herein, the SONET/SDH concepts are more fully detailed in various ANSI and ITU standards, including but not limited to the discussion of concatenated payloads, ITU-T G.707 2000, T1.105-2001 (draft), and T1.105.02-1995.

SONET/SDH may employ at least two different types of payloads called contiguously concatenated payloads and virtually concatenated payloads. The difficulty with employing both contiguously concatenated and virtually concatenated payloads is that multiple paths may be required to process data received in both formats. Two paths and/or two processors may typically be employed to address both types of payloads. Contiguously concatenated payloads may, for example, be provided on one path and processed with knowledge that only contiguously concatenated data is received, while virtually concatenated payloads may be processed on another path with similar knowledge about the payloads received. While separate pipelines and/or separate processors may enable systematic and straightforward processing, such a multiple path implementation tends to decreased throughput and is generally inefficient.

A design that enables both contiguously concatenated payloads and virtually concatenated payloads to be processed irrespective of the type of payload received may provide increased throughput and other advantageous qualities over previously known designs, including designs employing the SONET/SDH architecture.

DESCRIPTION OF THE DRAWINGS

The present invention is illustrated by way of example, and not by way of limitation, in the figures of the accompanying drawings in which:

FIG. 6 is an algorithm for generating pseudo multi frame indications, or MFIs;

FIG. 8 illustrates the traffic pattern from FIG. 7 after reformatting;

FIGS. 11A-11F present operation of the design of FIG. 10;

FIGS. 13A-E show operation of the reformatting design of FIG. 12.

DETAILED DESCRIPTION OF THE INVENTION

Figure 1:
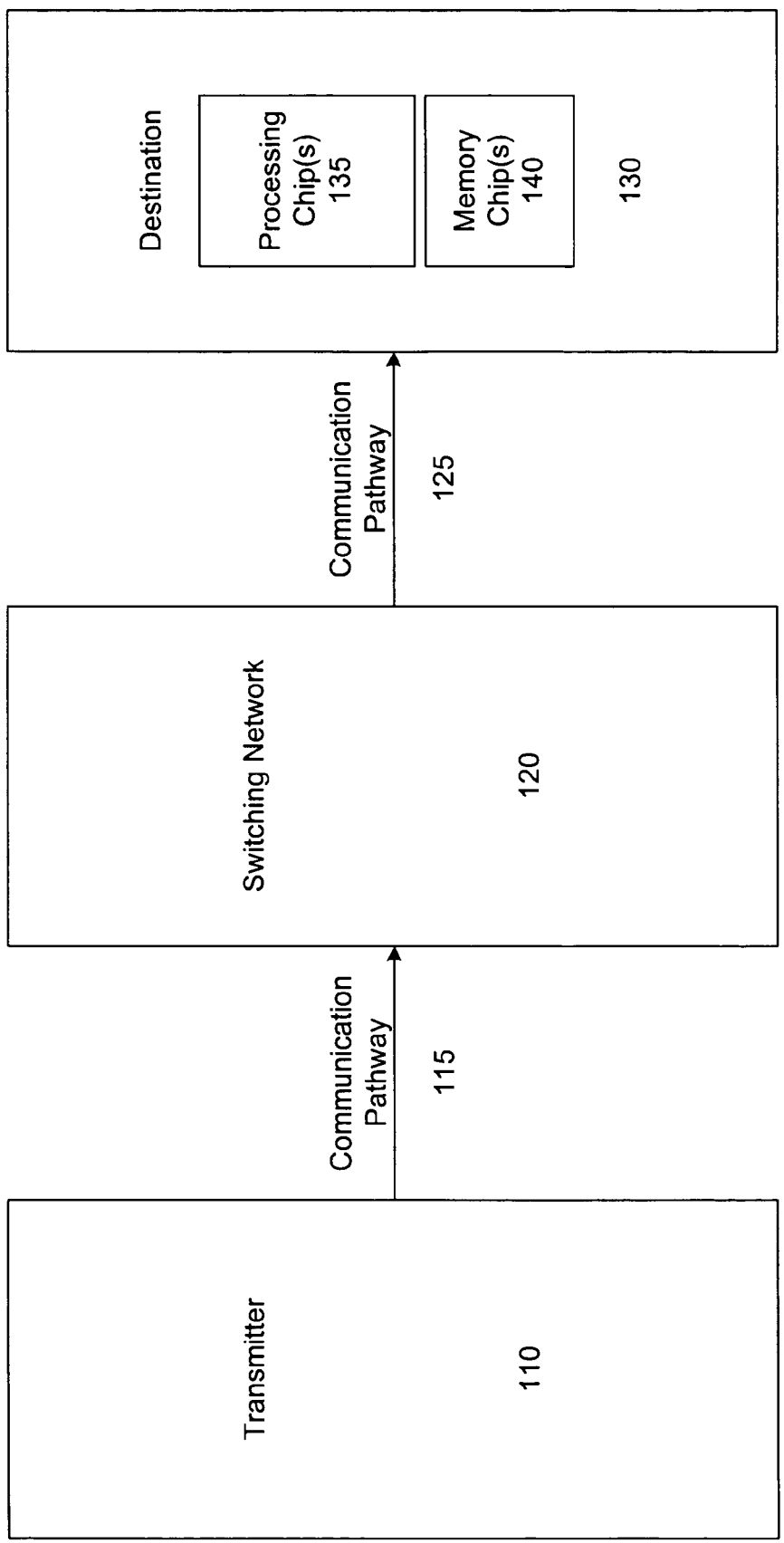
FIG. 1 is a conceptual illustration of a SONET/SDH communications switching system.

The present design provides for simultaneously addressing payloads or packets of data having different sizes or parameters. While the description provided herein is applicable to the SONET/SDH architecture, it is to be understood that the invention is not so limited, and may be employed in other transmission architectures.

SONET/SDH defines optical carrier levels and electrically equivalent synchronous transport signals (STSs) for the fiber-optic based hierarchy. In SONET, any type of service, ranging from voice to high speed data and video, can be accepted by various types of service adapters. A service adapter maps the signal into the payload envelope of the STS-1 or virtual tributary. All inputs received are eventually converted to a base format of a synchronous STS-1 signal at 51.84 Mbps or higher. Several synchronous STS-1s may then be multiplexed together in either a single or two stage process to form an electrical STS-n signal, where n is one or more.

SONET uses a basic transmission rate of STS-1, equivalent to 51.84 Mbps. Higher level signals are integer multiples of the base rate. For example, STS-3 is three times the rate of STS-1, i.e. three times 51.84 or 155.52 Mbps, while an STS-12 rate would be twelve times 51.84 or 622.08 Mbps. The SONET architecture employs frames, where the frame is generally divided into two main areas: transport overhead and the synchronous payload envelope, or SPE. The SPE comprises two components, namely STS path overhead and payload. The payload is the traffic being transported and routed over the SONET network. Once the payload is multiplexed into the SPE, the payload can be transported and switched through SONET without having the need to be examined and possibly demultiplexed at intermediate nodes.

The SONET/SDH architecture supports contiguous concatenation, wherein a few standardized "concatenated" signals are defined, and each concatenated signal is transported as a single entity across the network. The concatenated signals are obtained by assembling, end to end, the payloads of the constituent signals, to form the contiguously concatenated payload. The payloads of the constituent signals arrive in fixed sizes, namely sizes specified for the SPE and STS arrangements described above. In creating, assembling or processing the contiguously concatenated payloads, the SONET/SDH standards establish certain rules for the arrangement or placement of standard concatenated signals. These rules were intended to ease the development burden for SONET/SDH designers, but the rules can significantly affect the bandwidth efficiency of SONET/SDH links.

In order to address certain shortcomings of the contiguously concatenated payloads, the SONET/SDH architecture also supports the concept of Virtually Concatenated Payloads. Virtual concatenation enables dividing payloads to improve partitioning of SONET/SDH bandwidth and more efficiently carry traffic. Virtual concatenation employs the base SONET/SDH payloads and groups these payloads together to create a larger, size appropriate aggregate payload based on the STS and SPE employed. Virtual concatenation thus enables variation of the payload capacity and allows payload sizes matching client service data rate. This sizing enhancement allows a larger number of channels to be mapped into the SONET/SDH signal.

A typical SONET/SDH switching system 100 is shown in FIG. 1. In the SONET/SDH switching system 100, a transmitter 110 is connected through a communication pathway 115 to a switching network 120. Switching network 120 is connected through a communication pathway 125 to a destination 130. The transmitter 110 sends a frame as a series of payloads to the destination 130 through the switching network 120. In the switching network 120, packets typically pass through a series of hardware and/or software components, such as servers. As each payload arrives at a hardware and/or software component, the component may store the payload briefly before transmitting the payload to the next component. The packets proceed individually through the network until they arrive at the destination 130. The destination 130 may contain one or more processing chips 135 and/or one or more memory chips 140.

In the SONET/SDH architecture, payloads may be transmitted in contiguously concatenated payloads and virtually concatenated payloads. The contiguous concatenation payload scheme uses a concatenation indicator in the pointer associated with each concatenated frame. The concatenation indicator indicates that the SPEs associated with the pointers are concatenated. Generally, every intermediate node or intermediate hardware/software component through which the concatenated string passes is configured to support contiguous concatenation. Payloads are generally of fixed sizes in contiguous concatenation.

Figure 2A:
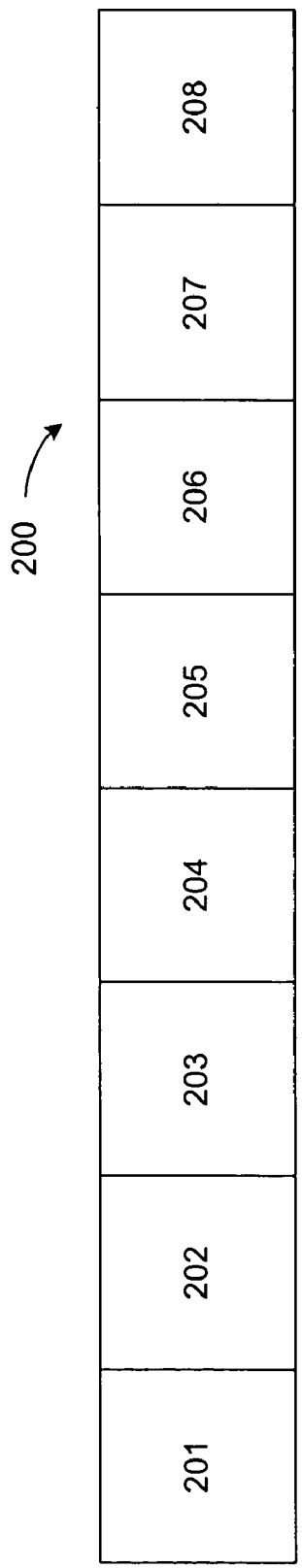
FIG. 2A shows an empty STM-8 signal having eight time slots.
Figure 2B:
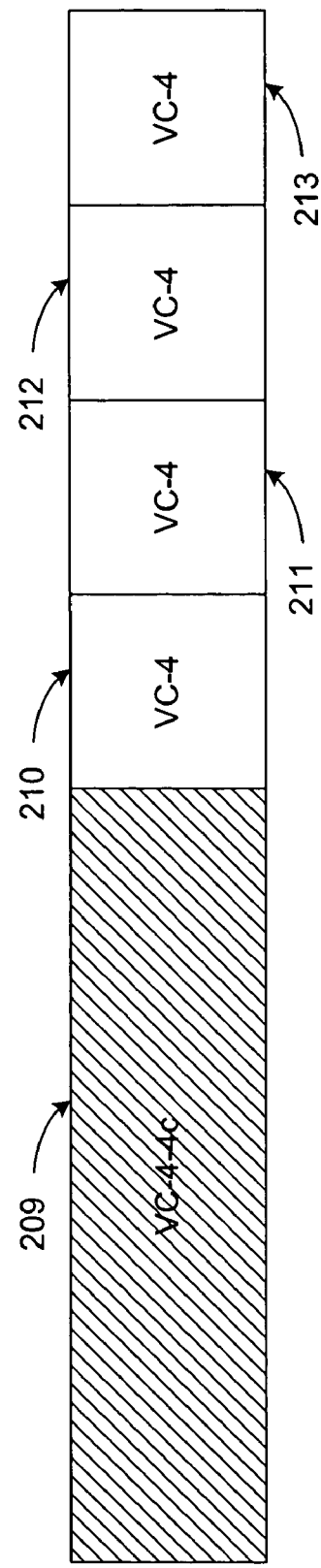
FIG. 2B shows the STM-8 signal having one VC-4-4c virtual container and four VC-4 virtual containers included in the eight time slots.

Contiguously concatenated payloads addressed may include those having payloads and data transfer rates designated in SONET/SDH as VC-4-Xc, where x is 1, 4, 16, or 64 for standard rate and other values between 1 and 64 for non-standard rate. Generally, these represent virtual containers of data, where, for example, VC-4-4c is a virtual container with four columns of fixed data, namely one column of path overhead and three columns of fixed data, and 1040 columns of payload data. VC-4-Xc virtual containers are loaded into an STM-X signal, where X may be any number of time slots, but typically 4, 16, etc. FIG. 2A shows an empty STM-8 signal 200 having eight time slots 201-208. FIG. 2B shows a non-standard STM-8 signal having one VC-4-4c virtual container 209 in time slots 1-4 and four VC-4 virtual containers 210-213 included in time slots 5-8. Other contiguously concatenated payload arrangements may be employed. Data transfer rates for these designations have the following values: VC-4-4c is 599.040 Mbit/s, VC-4-16c is 2,396.160 Mbit/s, and VC-4-64c is 9,584.640 Mbit/s.

Virtual concatenation is available as an alternative to contiguous concatenation in transmitting payloads across the network. In virtual concatenation, each SPE within a concatenated group representing the data frame for transmission contains an identifier, called a Multi-Frame Identifier, or MFI. The MFI forms part of the SONET/SDH path overhead information in the SPE and indicates the SPE's sequence and position within the group. As may be appreciated, the ability to identify the individual payloads by the MFI provides the ability for the system to split the payloads into various sizes or configurations, as long as the MFI is provided with each payload.

Virtual concatenation does not require intermediate node support, so the destination 130 for the network is the only specialized hardware required. The destination 130 reassembles the SPEs in the correct order to recover the data. To compensate for different arrival times of the received data, a phenomenon known as differential delay, the receiving circuits has typically contained some buffer memory so that the data can be properly realigned.

The transmission rates and capacities of virtually concatenated payloads may vary, and may include, for example, SONET/SDH designations VC-3 and VC-4, which have payload capacities of 48.960 Mbit/s and 149.760 Mbit/s, respectively. Again, the VC-3 and VC-4 designations represent the virtual containers where, for example, VC-4 includes 9 rows of 261 columns transmitted in a 125 microsecond interval, and VC-3 is 9 rows of 85 columns transmitted in the 125 microsecond interval.

The common challenge faced occurs upon reception of both contiguously concatenated payloads and virtually concatenated payloads. When both types of payloads are received, they are typically stored in storage buffers and reassembled either by separate processors or by a single processor that must await receipt of all payloads, contiguously or virtually concatenated. Due to the differential delay, data or payloads in the same group may arrive at the destination 130 at different times. In a dual processor or dual channel configuration, the system can be slow to act on the payloads received.

In the present design, the destination 130 uses the MFI value to realign the VC-3 or VC-4 payloads belonging to the same group. The MFI value and the position in the virtual container determine whether two bytes from two different payloads were generated at the same time on the source side. To compensate for the differential delay, the destination 130 uses alignment buffers to store incoming data for each payload. The destination 130 reads data from the different payloads from the various alignment buffers having the same MFI and byte position at the same time. By associating the MFI and byte position in the virtual container with the corresponding byte at the input to the alignment buffer, the destination 130 can realign the data at the output of the buffer.

Incoming SONET/SDH traffic may be byte interleaved among different time slots at a given rate. In one aspect of the present design, multi-rate ports may be provided, such as STM-1, STM-4, STM-16, and STM-64, having a data path width of 8 bytes and each byte in the format of a non-standard frame before conversion of the associated data.

Figure 3:
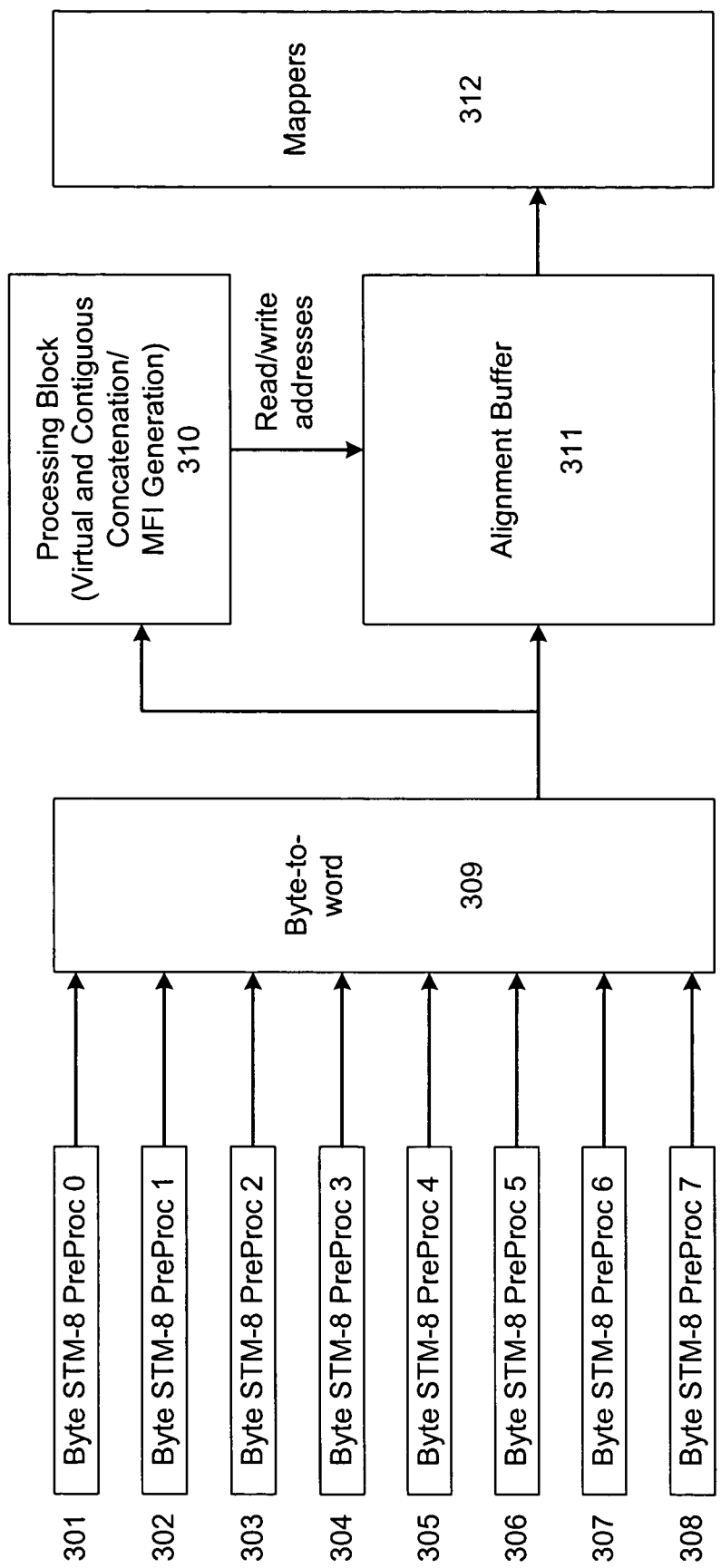
FIG. 3 is one implementation of the present design.

One implementation of the present design is presented in FIG. 3. From FIG. 3, eight byte STM-8 (non-standard frame) preprocessors may be employed, numbered 301-308. Each incoming word belongs to a different time slot, one column out of every 192 columns at the STS-1 rate. The eight preprocessors 301-308 receive the SONET/SDH payload data in bytes which may be in any SONET/SDH compliant format, such as contiguously concatenated and virtually concatenated payload formats. As 192 STS-1 time slots exist in STM-64, after 24 clock cycles, the eight preprocessors 301-308 receive 192 slots of incoming data. Byte-to-word converter 309 then converts each of the 8 bytes from the 24 clock cycles, or interleaves one word of one time slot from each STM-8. Once the data is converted to words, the words then pass to processing block 310. Data may be either virtually concatenated or contiguously concatenated when received by processing block 310.

Figure 4A:
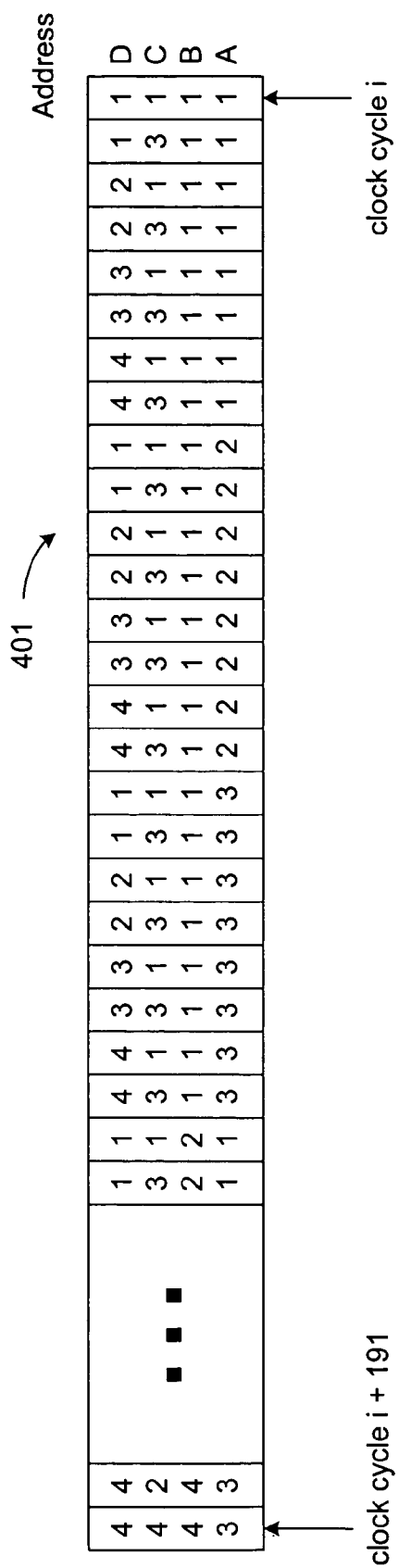
FIG. 4A shows a data ordering pattern as may be encountered in a SONET/SDH environment.

In one aspect of the design, using AU-3 numbering as found in the ITU standard, in STM-64, at 10 Gbps, the ordering pattern 401 shown in FIG. 4A results. Each clock cycle in ordering pattern 401 represents one word. The index of a slot may be represented by:

$$\text{Index} = (D-1)*48 + (C-1)*12 + (B-1)*3 + (A-1) \quad (1)$$

Figure 4B:
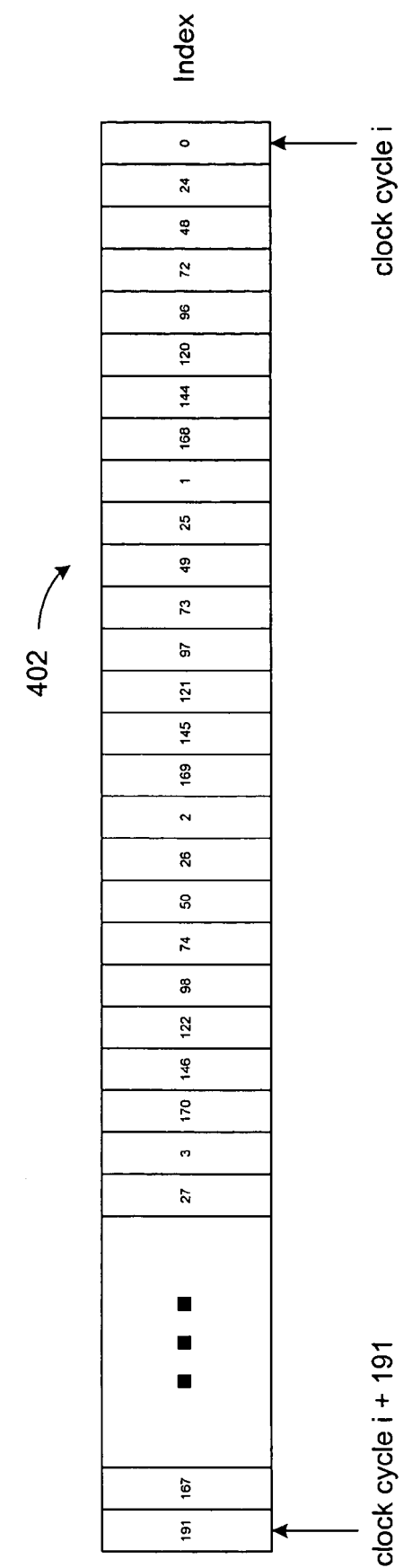
FIG. 4B is a reoriented or reindexed data ordering pattern of the pattern of FIG. 4A.

FIG. 4A may then be reconfigured or re-indexed to the pattern 402 as shown in FIG. 4B. In this arrangement, after differential delay compensation and removal of SONET/SDH overhead, virtually no difference exists between processing contiguously concatenated payloads and virtually concatenated payloads.

Data Reformatting

Figures 5, 7:
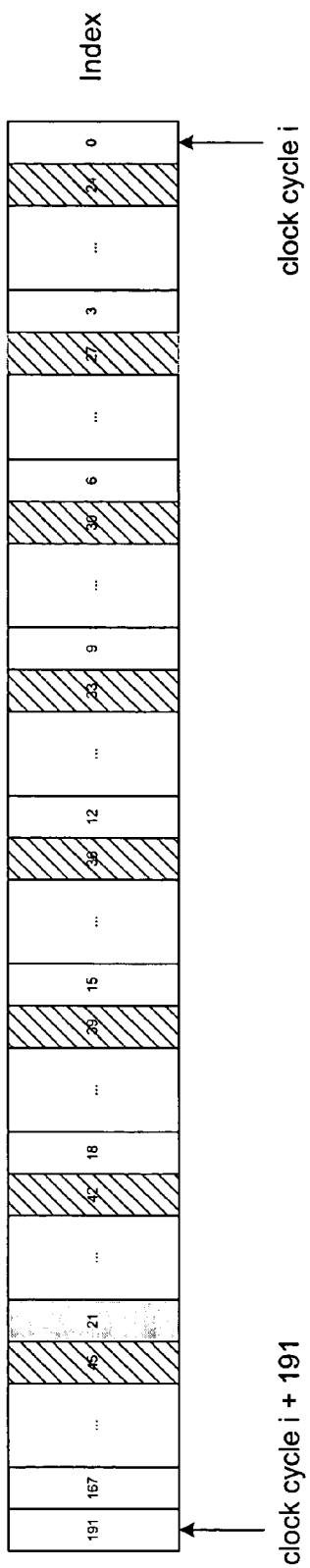
FIG. 5 illustrates the order for arrival of words from certain time slots as may be encountered in a SONET/SDH environment.
FIG. 7 illustrates an example of a traffic pattern that may be received by the eight preprocessors of the design in FIG. 3.

The eight preprocessors 301-308 operate as follows. For a 10 Gbps signal (STM-64), with an internal processing frequency of 155.52 Mhz and a data path eight bits wide, employing STS-1, the traffic pattern illustrated in FIG. 7 may be received by the eight preprocessors. Time zero is at the right side of FIG. 7, and each rectangle represents one byte from an STS-1 time slot. The slot number in FIG. 7 is used to identify a slot, and is not related to the SONET/SDH interleaving sequence. The top line, representing data received at the first preprocessor 301, includes STS-1 bit numbers 0 through 23 for all eight bytes received, while the second line represents STS-1 bit numbers 24 through 47 for all eight bytes received.

Figure 8:
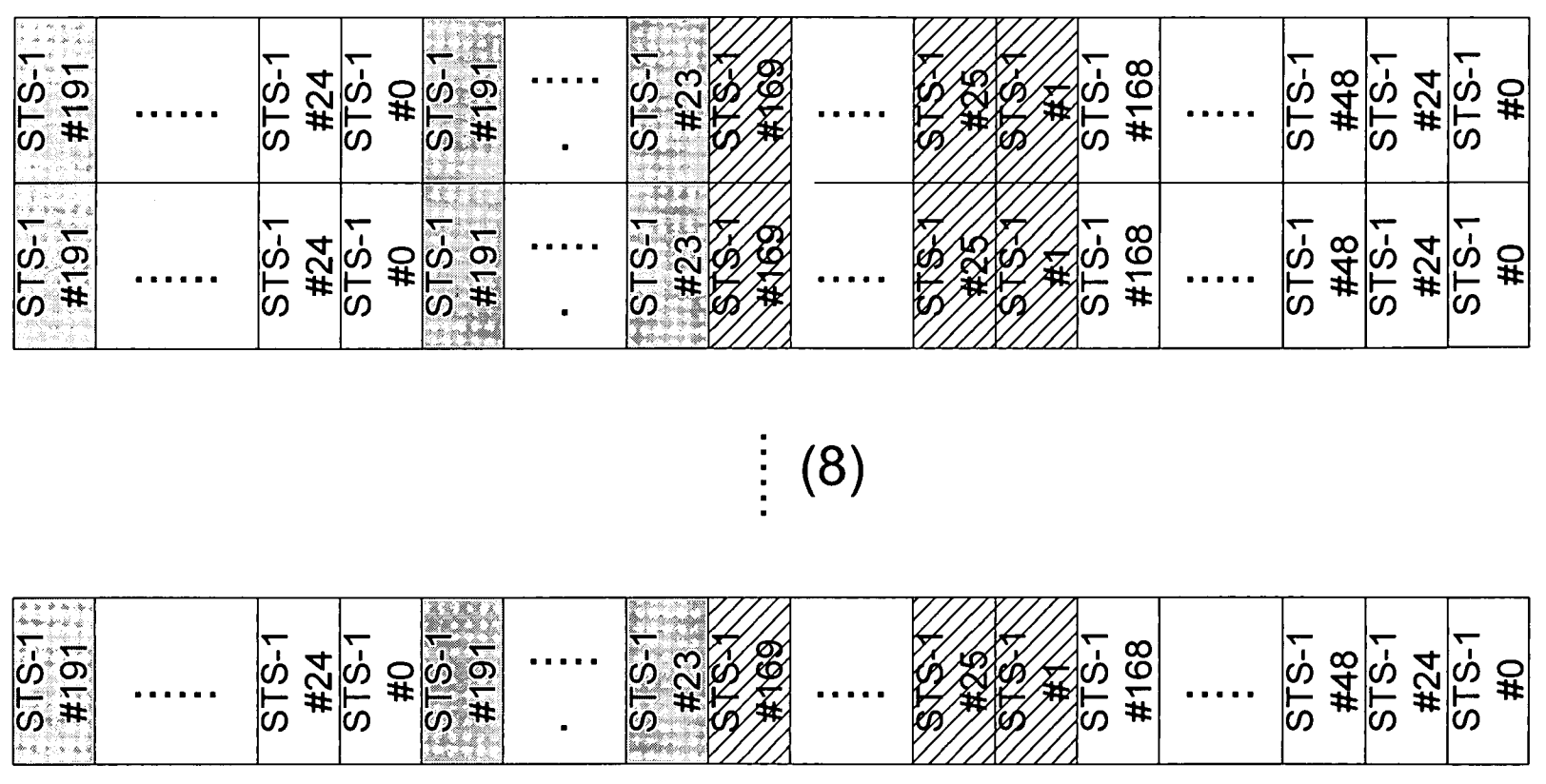

In order to provide data for subsequent processing in a standardized and ordered manner, the present design reformats the incoming data by accumulating all eight bytes for each STS-1 time slot. This reformatting enables ordered reading and writing of data in compliance with SONET/SDH standards and enabling use of shared processing hardware. Once reformatted, the data is made available in the format shown in FIG. 8. The reformatting of FIG. 8 provides data from one time slot for every clock cycle. Data on each line, again representing data at first preprocessor 301, provides data at STS-1 slot numbers 0, 24, 48, 72, up to 168, followed by data at STS-1 slot numbers 1, 25, 49, 73, up to 169, and so forth, up to data at STS-1 slot numbers 23, 47, 71, 95, up to 191.

This reformatting enables reading 8 bytes of data from the same slot in a single clock cycle. Typical hardware and FIFO design has prohibited reading data in this manner, as data bytes from the same slot are all in the same RAM areas and the RAM width is only 8 bits. At most, in this hardware arrangement, one byte may be read from each slot during one clock cycle, not 8 bytes. In previous hardware arrangements, if one byte is removed for a certain STS-1 time slot, the time slot will not have 8 bytes available for reading. When output has a strict interleaving pattern, such as is required by SONET/SDH, the next time data bytes from the aforementioned time slot may be read is 192 cycles later. During the 192 clock cycles, more data bytes will arrive and additional storage space may be necessary. The reformatting detailed herein enables reading eight bytes from each slot during one clock cycle.

The present reformatting uses 512 or 1024 flip flops, but other data arrangements employing different architectures and/or parameters may employ a larger or smaller number of flip flops. Use of 512 or 1024 flip flops in the present example can enable writing of data bytes from the same set of slots during every eight clock cycles.

Figure 9:
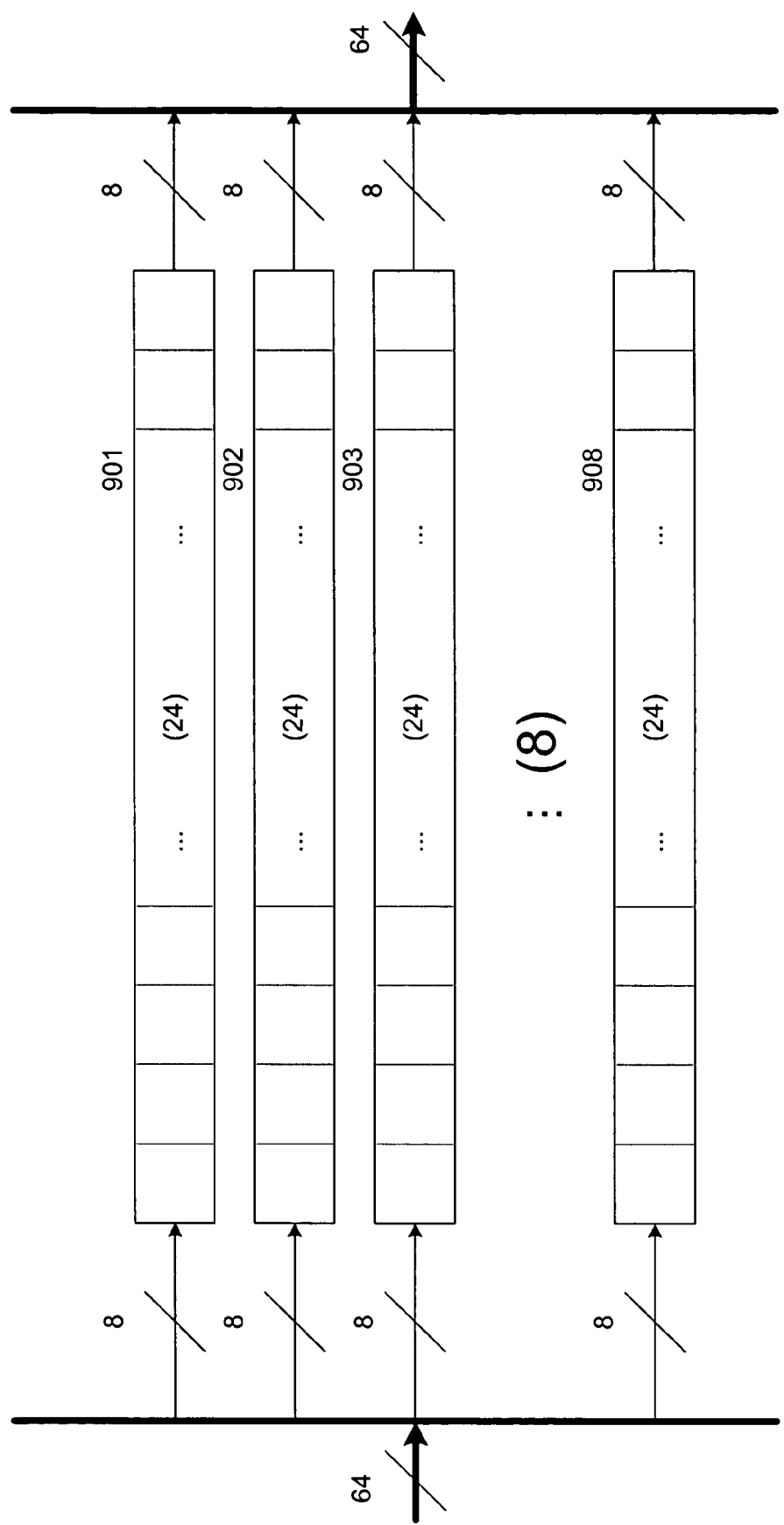
FIG. 9 shows eight physical FIFOs each containing 24 logical FIFOs.

Data is first written into a 1 byte wide FIFO associated with the given slot. One byte-FIFO is required for each byte in the data path to accommodate the different read time at the output. Each byte-FIFO is time sliced into 24 logical FIFOs for each of the 24 STS-1 time slots. The size of each FIFO may be determined for the implementation as follows: as 8 bytes are read while accumulating another 8 bytes, 16 bytes may be available. To account for addition and removal of bytes, another 8 bytes of data may be required. Reading of the FIFOs may start at different times for each FIFO, requiring an additional 8 bytes of data, totaling 32 as the total number of bytes available per logical FIFO. FIG. 9 shows 8 physical FIFOs each containing 24 logical FIFOs.

One processor reads 8 bytes from eight different STS-1 time slots from FIFOs during each clock cycle. This processor then writes data into the reformatting flip flops. At the output of the reformatting flip flops, 8 bytes from the same STS-1 time slot may be read at one time. Reading 8 bytes from the same STS-1 time slot during 8 consecutive clock cycles and outputting data from the reformatting flip flops will be available in 8 clock cycles instead of 192, using the 1-byte wide FIFO memories before the reformatting flip flops.

Figure 10:
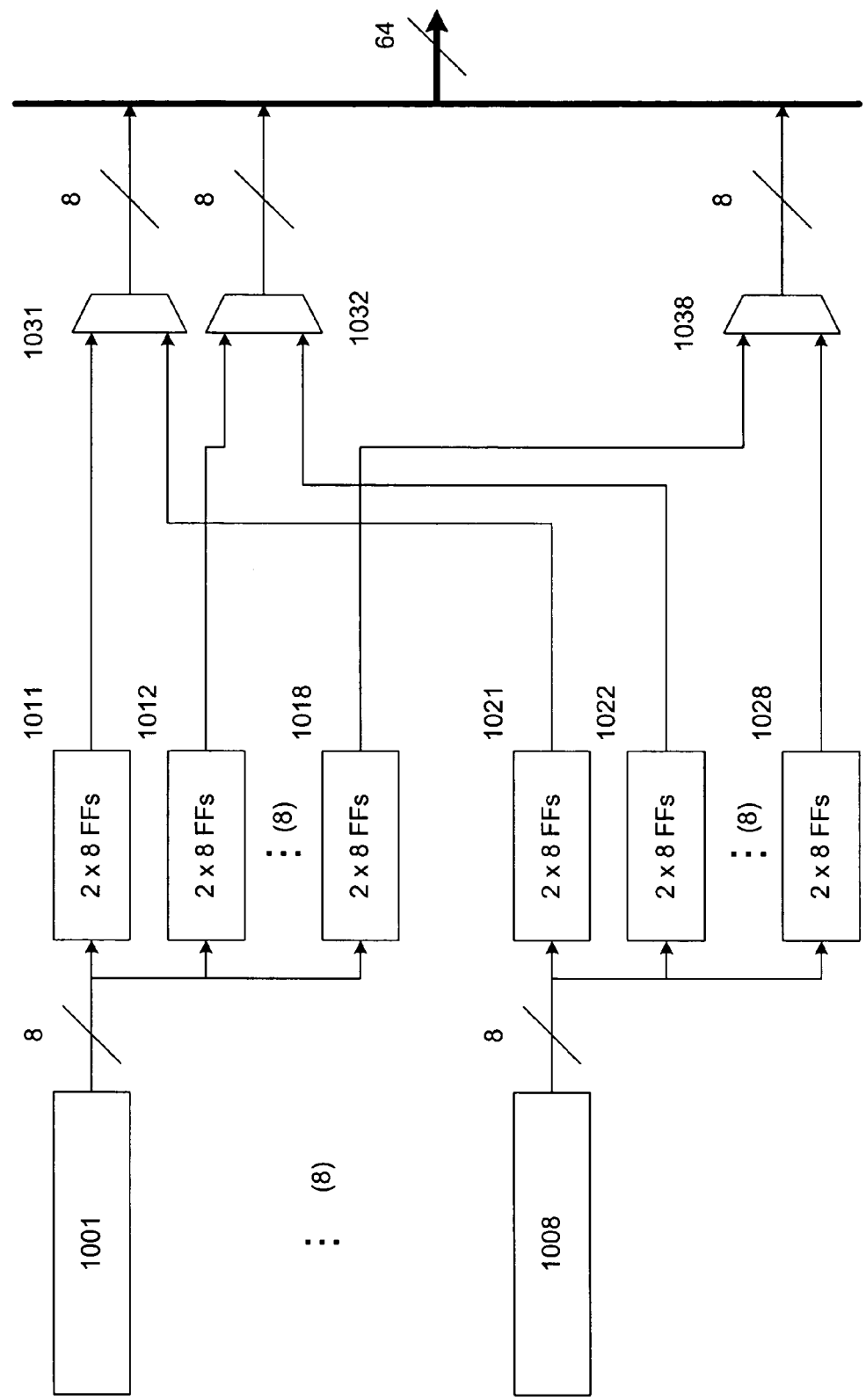
FIG. 10 is an example of an implementation of an interleaved data read-write reformatting method according to the present design.

Alternately, the system may employ two sets of flip flops for reformatting data into the desired format. While writing in one set, the other set is read. Operation in such a design entails first writing to a first set of data, then writing to a second set of data while reading from the first, and finally reading from the second and writing to the first, and so on. Operation of such an interleaved read-write method and implementation thereof is illustrated in FIG. 10. From FIG. 10, the eight sets of physical FIFOs 1001 through 1008 write data to multiple sets of 2 by 8 flip flops, including 2 by 8 flip flops 1011-1018 and 1021-1028. Data is then provided to a series of multiplexors, such as multiplexors 1031, 1032, and 1038, which combine the data from the first set of flip flops (1011 and 1021, for example) into an 8 byte word, and data from the second set of flip flops (1012 and 1022, for example) into another 8 byte word, and so forth.

Figures 11A, 11B, 11C:
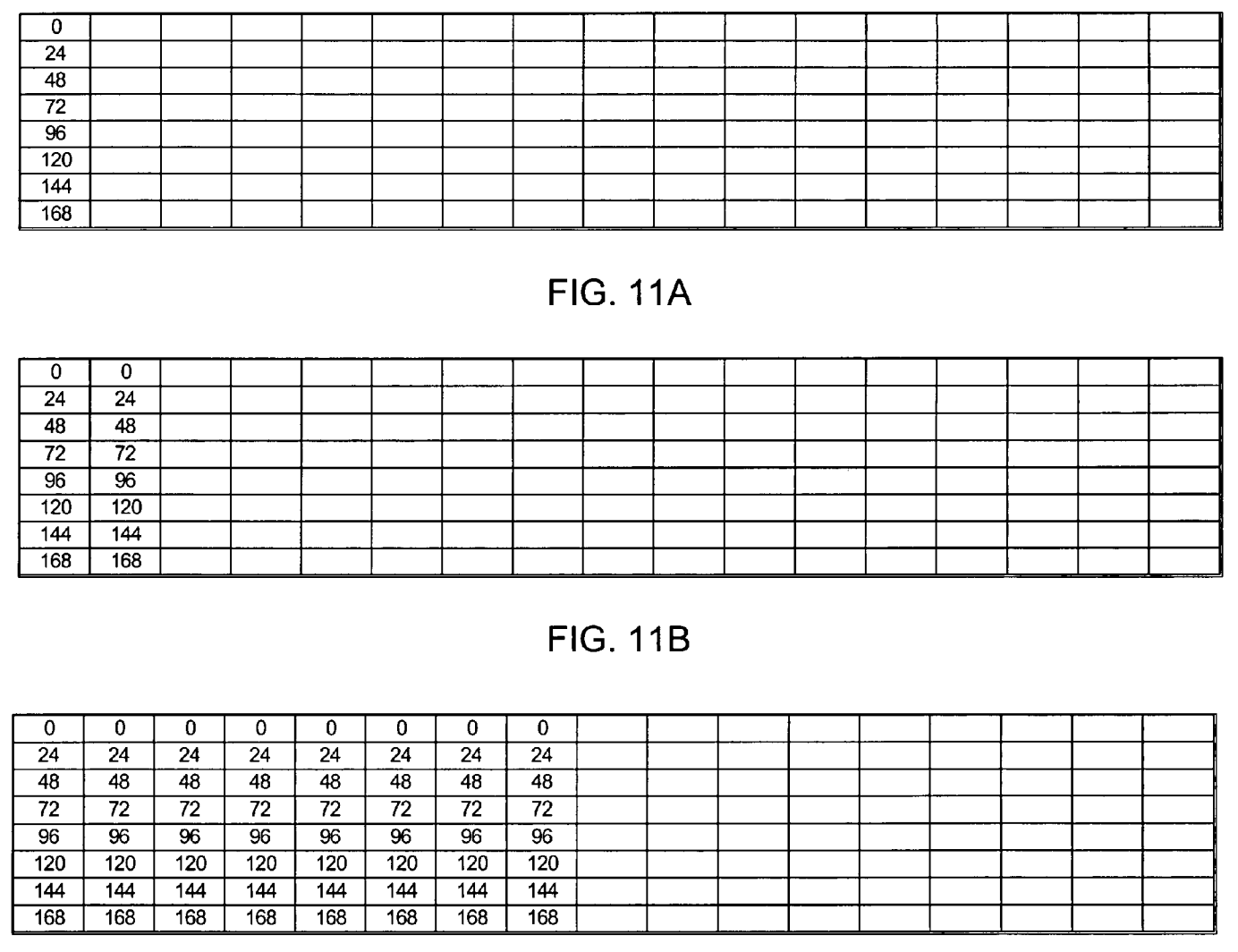
Figures 11D, 11E, 11F:
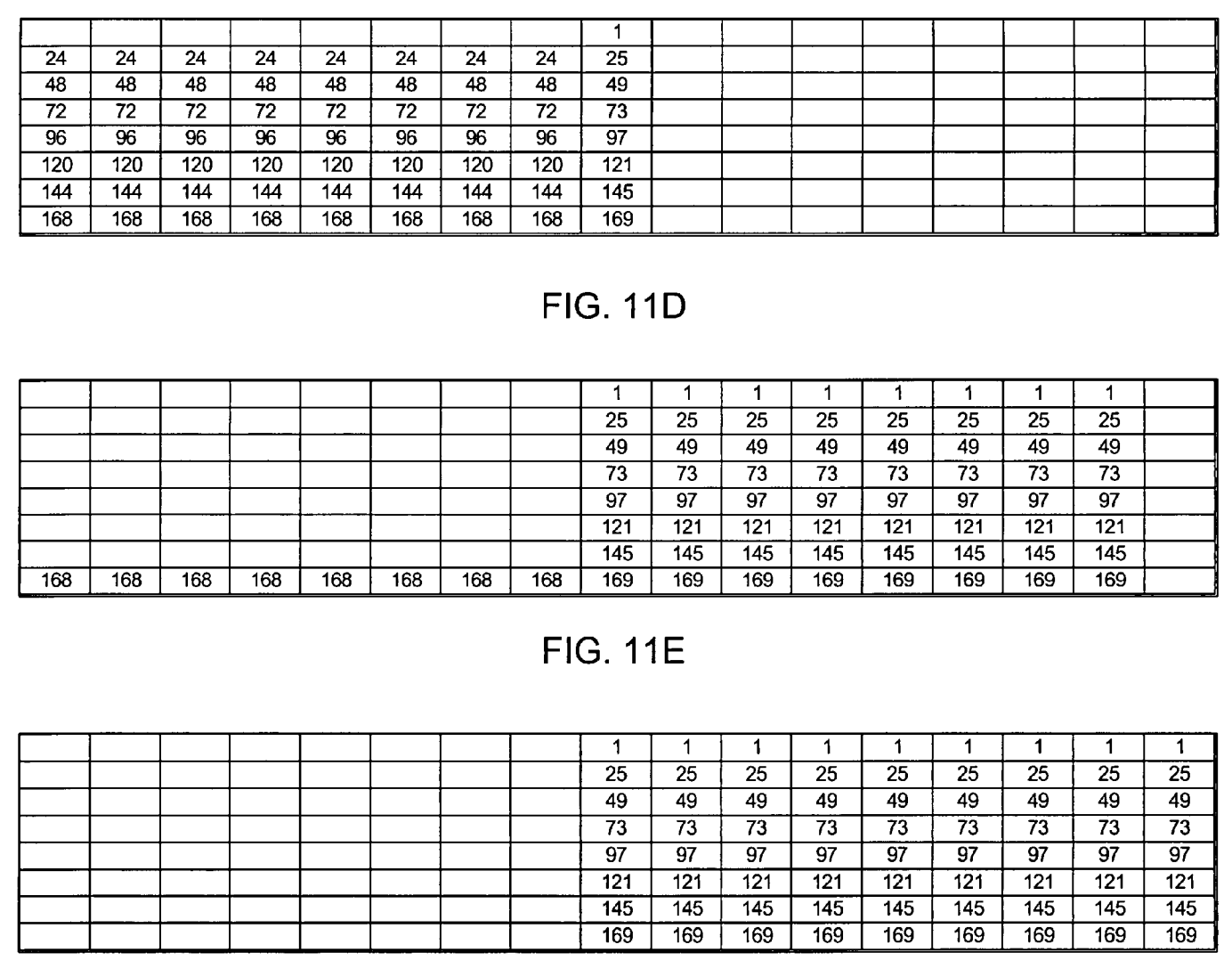

The implementation of FIG. 10 operates to transfer data as shown in FIGS. 11A-11F. Each square in FIGS. 11A-11G represent 8 flip flops or one byte of data. The number in each square represents the slot to which the data byte belongs. After the first clock cycle, data appears as shown in FIG. 11A. After 2 clock cycles, the data received appears as shown in FIG. 11B. After eight clock cycles, the data received appears as shown in FIG. 11C. The processor then can read eight bytes from a lot, and the eight bytes may be read from any of slots 0, 24, 48, . . . , 168. For example, the network may read slot 0 in the next clock cycle, and can write one data byte each from slots 1, 25, 49, . . . , 169 in the next clock cycle. After 9 clock cycles, the data appears as shown in FIG. 11D, where slot 0 data has been removed and new data added in the rightmost column. Eight bytes may read and 8 written for each of the next several cycles. After 15 cycles, the data appears as shown in FIG. 11E. The final eight bytes may be read in the $16^{th}$ clock cycle, and the result after the $16^{th}$ clock cycle is as shown in FIG. 11F. At this point, the process may be repeated to read and write concurrently and fill and empty the flip flops.

Figure 12:
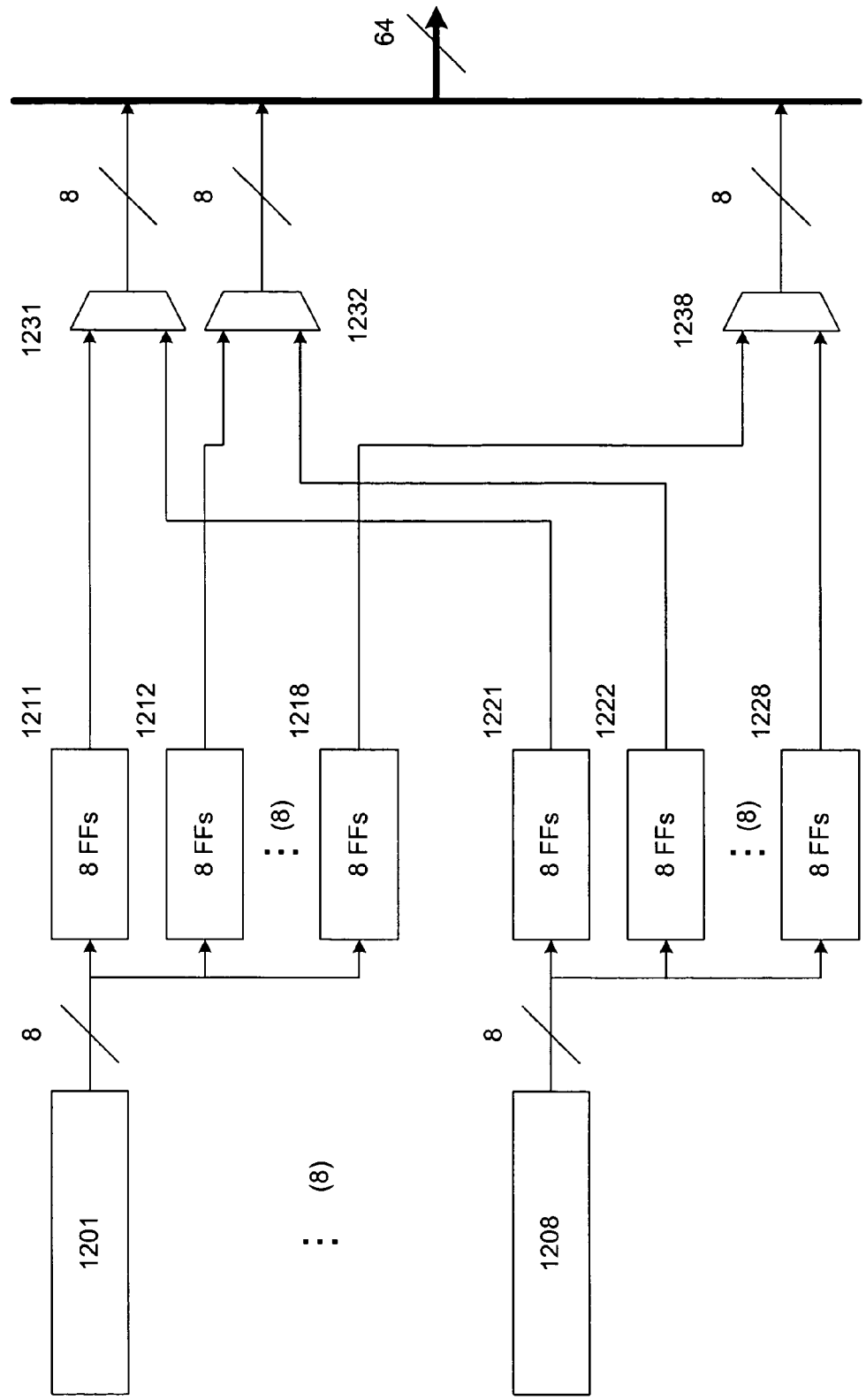
FIG. 12 illustrates an alternate reformatting implementation according to the present design that uses a limited number of flip flops.

Another implementation of reformatting is illustrated in FIG. 12. From FIG. 12, the eight sets of physical FIFOs 1201 through 1208 write data to multiple sets of 8 flip flops, including 8 flip flops 1211-1218 and 1221-1228. Data is then provided to a series of multiplexors, such as multiplexors 1231, 1232, and 1238, which combine the data from the first set of flip flops (1211 and 1221, for example) into an 8 byte word, and data from the second set of flip flops (1212 and 1222, for example) into another 8 byte word, and so forth.

This design uses only half the flip flops, namely 512 flip flops instead of 1024, and may employ a specific reading and writing arrangement.

Figure 13A:
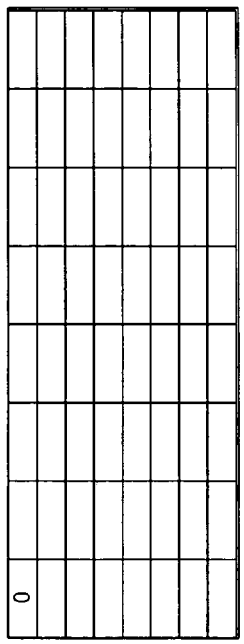
Figure 13B:
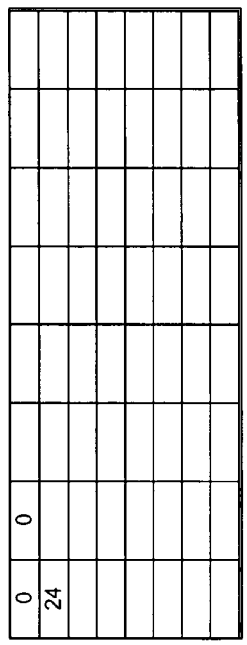
Figure 13C:
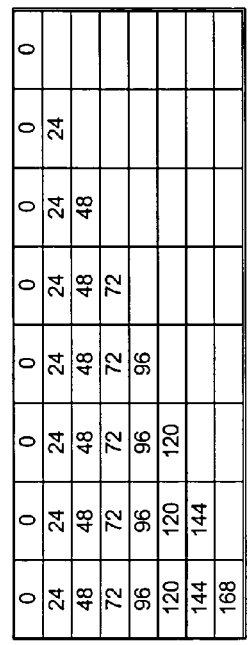

Reading and writing this data is illustrated in FIGS. 13A-E. Data written after one clock cycle appears as shown in FIG. 13A. After two clock cycles, data appears as in FIG. 13B, and after eight cycles as in FIG. 13C. After the eighth clock cycle, the network can read 8 bytes of data from slot 0 and will simultaneously write one byte of data from blocks 1 to 8. After nine clock cycles, the data appears as shown in FIG. 13D, and after 10 clock cycles as in FIG. 13E. This diagonal reading and writing arrangement may proceed indefinitely, and enables use of fewer flip flops.

Processing Payloads

The complete reconstructed word, contiguous or virtual, is provided to the processing block 310. Processing block 310 associates each virtually concatenated word with a number based on its MFI and position in the container, where the container may be a buffer or other data maintenance device, real or virtual. The number determines the time when processing block 310 reads the corresponding word at the output of alignment buffer 311 relative to all other time slot components in the same group. In certain configurations, such as the VC-4 configuration, the first time slot contains the MFI information and aligning and reading the MFI information in the first time slot enables processing of the virtually concatenated payload.

Contiguously concatenated payloads contain no MFI information. In order to share the same path, including the same alignment buffer 311, with a virtually concatenated payload, the same data read/write algorithm can be employed in this aspect of the design. The processor, and specifically the processing block 310, may therefore establish a pseudo MFI for all contiguously concatenated time slots. In the SONET configuration, all VC-4s in the same VC-4-Xc data rate configurations may have the same MFI values for the virtual container generated by the processing block 310. The master slot of a VC-4-Xc payload may generate an independent MFI value and all slave slots will use the same MFI value as the master slot.

For nonstandard VC-4-Xc payloads, namely where X is not equal to 1, 4, 16, or 64, VC-4s contained in the same VC-4-Xc may spread over different STM-8 signals (or STM-16 or other signals). In such a nonstandard configuration, the master slot may be received at the destination 130 at a time later than slots in the same VC-4-Xc. For example, VC-4-9c virtual containers reside in slots having indices 21 through 47, where the words from the corresponding time slots arrive in the order illustrated in FIG. 5. Master slots are shown in dark grey while slave slots are cross hatched.

The pseudo MFI for a contiguously concatenated payload may be generated by the processing block 310 in varying ways. One way to form the pseudo MFI involves increasing the MFI value for the master slot by one at the beginning of each frame. The word number is 0 at the beginning of each frame. Subsequent slots in each VC-4 may copy the pseudo MFI from the previous slot. Slots in the same VC-4 typically arrive in order and thus copying later slots based on the first (master) slot MFI value will enable uniform pseudo MFI assignment. For the first time slot in each VC-4 other than the master slot, the processing block 310 copies the first slot from the previous VC-4. An algorithm for generating pseudo MFIs is illustrated in FIG. 6.

From FIG. 6, the processing block 310 determines whether the current slot indices are divisible by three. As more words may be available in each frame than the number of time slots divided by three, the algorithm seeks to ensure that all time slots in the same VC-4-Xc virtual container have the same MFI value. If the current slot index is not divisible by three, and the current word number is zero, the MFI of the current slot index is equal to the MFI of the current slot index minus one. For example, if the slot index is 25 and the current word number is zero, the MFI of slot index 25 is equal to the MFI of slot index 24. If the current slot is a master slot, and the current word number is one, the temporary MFI of the current slot index is equal to the temporary MFI of the current slot index plus one. For example, if the slot is a master slot and the word number is one, and the slot index is, for example, 21, the temporary MFI of slot 21 is equal to the temporary MFI for slot 21 plus one. If the temporary MFI for slot 21 was 1203, the temporary MFI for slot 21 becomes 1204. If the current word number is zero, the MFI for the current slot index equals the temporary MFI for the current slot index. If the temporary MFI for slot 21 of word 0 is 1204, the MFI for slot 21 becomes 1204.

If the current slot is not a master slot and the current slot index is divisible by three, the final processing of the FIG. 6 algorithm occurs. If the current word number is equal to the current slot index divided by three plus one, then the temporary MFI for the current slot index is equal to the temporary MFI for the current slot index minus three. For example, if the current word number is 7, and the current slot index is 18, the word number (seven) is equal to the slot index (18) divided by three, or six, plus one, or seven. The temporary MFI for current slot index 18 is set equal to the temporary MFI for the current slot index (18) minus three, or 15. The temporary MFI for current slot 18 is set equal to the temporary MFI for slot 15. Otherwise, if the current word number is zero, the MFI for the current slot index is set equal to the temporary MFI for the current slot index. If current word number is zero and the current slot index is 12, the temporary MFI for slot 12 is provided as the MFI for slot 12.

From the foregoing, it may be appreciated that the current design entails receiving portions of a complete transmission, evaluating the portions of the transmission for indices and if indices are absent from the portions of the transmission, assigning an index to the portion and all portions of the complete transmission and passing the portions to a processor for processing irrespective of the presence or absence of indices. In the SONET/SDH environment, this entails receiving concatenated payloads, both virtual and contiguous, determining whether the payload is virtual or contiguous by evaluating the payload for the presence of an MFI, and if absent, providing an MFI, or pseudo MFI, to all payloads for the word transmitted. The payload may then be processed irrespective of whether it was virtually or contiguously concatenated using the SONET virtual concatenation ability at the receiving destination. The pseudo MFI is added to the contiguously concatenated payloads to enable processing by a single processor in a single path.

Returning to FIG. 3, read/write addresses are provided by the processing block 310 to the alignment buffer 311, which receives the data and aligns the data according to the read-write addresses provided. The aligned data is then provided to mappers 312 which map data for purposes of further processing.

It will be appreciated to those of skill in the art that the present design may be applied to other systems that perform data processing, and is not restricted to the communications structures and processes described herein. Further, while specific hardware elements and related structures have been discussed herein, it is to be understood that more or less of each may be employed while still within the scope of the present invention. Accordingly, any and all modifications, variations, or equivalent arrangements which may occur to those skilled in the art, should be considered to be within the scope of the present invention as defined in the appended claims.

What is claimed is:

1. A method for processing at least two types of payloads received at varying intervals in a communications network using a single processing path, said types of payloads including a first set of payloads having indices associated therewith, and a second set of payloads having no indices associated therewith, the method comprising:
   assigning pseudo indices to the second set of payloads having no indices associated therewith; and
   providing the first set of payloads having indices associated therewith and the second set of payloads having pseudo indices assigned to the single processing path, wherein the first set of payloads comprises virtually concatenated payloads according to SONET/SDH architecture, and the second set of payloads comprises contiguously concatenated payloads according to SONET/SDH architecture.

2. The method of claim 1, wherein the providing comprises aligning the first set of payloads having indices associated therewith and the second set of payloads having pseudo indices assigned in an alignment buffer to form aligned data.

3. The method of claim 2, wherein said providing further comprises sending the aligned data to a data mapping element.

4. The method of claim 2, wherein the aligning employs the indices for the first set of payloads to align the first set of payloads and the pseudo indices assigned to the second set of payloads to align the second set of payloads.

5. The method of claim 1, wherein the indices for the first set of payloads comprise multi frame indication indices and the pseudo indices assigned to the second set of payloads comprise pseudo multi frame indication indices.

6. The method of claim 1, wherein the indices for the first set of payloads comprise multi frame indication (MFI) indices and the pseudo indices assigned to the second set of payloads comprise pseudo MFI indices.

7. An apparatus for processing at least two types of payloads received at varying intervals in a communications network using a single processing path, said types of payloads including a first set of payloads having indices associated therewith, and a second set of payloads having no indices associated therewith, the apparatus comprising:
   a receiving preprocessing arrangement for receiving the first set of payloads and the second set of payloads, wherein the first set of payloads comprises virtually concatenated payloads according to SONET/SDH architecture, and the second set of Payloads comprises contiguously concatenated payloads according to SONET/SDH architecture;
   a processor configured to receive the second set of payloads and assigning pseudo indices to the second set of payloads having no indices associated therewith; and
   an alignment buffer configured to receive the first set of payloads, the second set of payloads, the indices for the first set of payloads, and the pseudo indices for the second set of payloads and provide aligned blocks of data.

8. The apparatus of claim 7, wherein the receiving preprocessing arrangement comprises a plurality of preprocessors configured to realign data.

9. The apparatus of claim 8, wherein the realignment of data comprises rearranging data into a predetermined format by simultaneously reading and writing data using a plurality of flip flops.

10. The apparatus of claim 7, wherein the alignment buffer provides the aligned blocks of data to a data mapping element.

11. The apparatus of claim 7, wherein the alignment buffer employs the indices for the first set of payloads to align the first set of payloads and the pseudo indices assigned to the second set of payloads to align the second set of payloads.

12. The method of claim 1, wherein the indices for the first set of payloads comprise multi frame indication (MFI) indices and the pseudo indices assigned to the second set of payloads comprise pseudo MFI indices.

13. The apparatus of claim 7, wherein the processor assigns pseudo indices for the second set of payloads based at least in part on word number and slot index for each payload of the second set of payloads.

14. A method for processing at least two types of payloads using a single processing path, said types of payloads including a first set of payloads having indices associated therewith and a second set of payloads having no indices associated therewith the method comprising:
   assigning pseudo multi frame indications to all contiguously concatenated payloads; and
   providing the virtually concatenated payloads and contiguously concatenated payloads having pseudo multi frame indications assigned thereto to the single processing path, wherein the first set of payloads includes virtually concatenated payloads and the second set of payloads includes contiguously concatenated payloads conforming to SONET/SDH requirements.

15. The method of claim 14, wherein the providing comprises aligning the virtually concatenated payloads and contiguously concatenated payloads having pseudo multi frame indices assigned in an alignment buffer to form aligned data.

16. The method of claim 15, wherein the aligning employs the multi frame indications for the virtually concatenated payloads to align the virtually concatenated payloads and the pseudo multi frame indications for the contiguously concatenated payloads to align the contiguously concatenated payloads.

17. The method of claim 15, wherein assigning pseudo multi frame indications is based at least in part on word number and slot index for each payload of the contiguously concatenated payloads.

* * * * *